Figure 1:
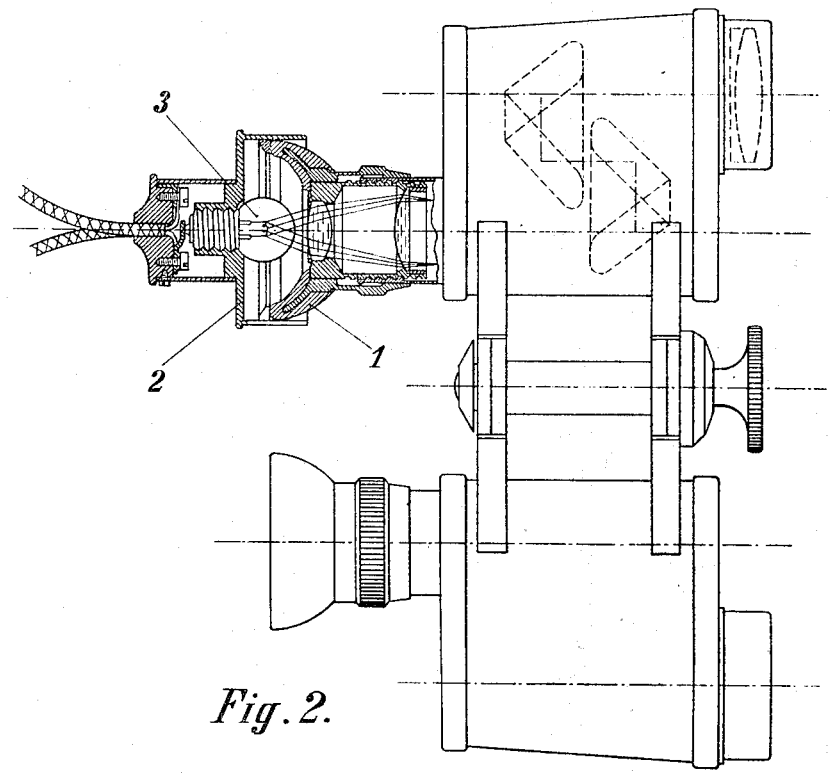

H. JACOB.
AIMING DEVICE.
APPLICATION FILED FEB. 26, 1914.

1,160,615.

Patented Nov. 16, 1915.
3 SHEETS—SHEET 1.

Witnesses.
Paul H. Franke
May T. Trimble

Inventor
Heinrich Jacob
by
Raegener + Matty Attys

H. JACOB.
AIMING DEVICE.
APPLICATION FILED FEB. 26, 1914.
1,160,615.
Patented Nov. 16, 1915.
3 SHEETS—SHEET 2.
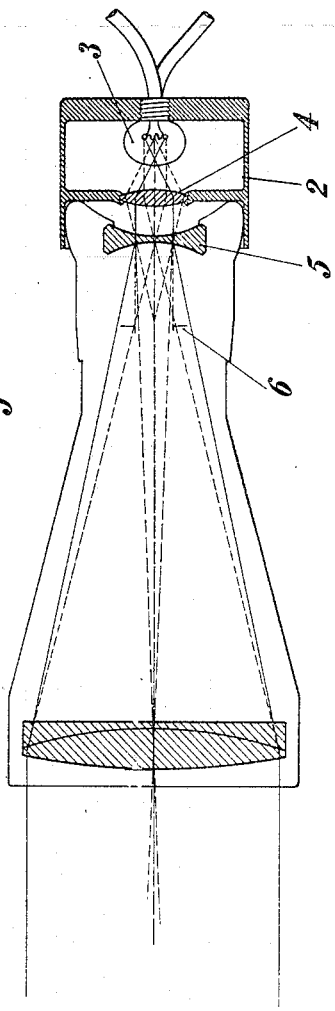
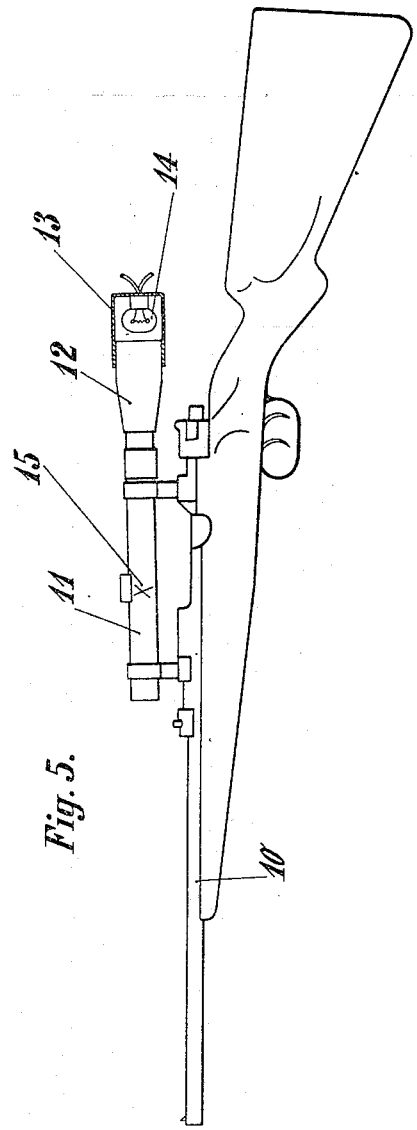

H. JACOB.
AIMING DEVICE.
APPLICATION FILED FEB. 26, 1914.

1,160,615.

Patented Nov. 16, 1915.
3 SHEETS—SHEET 3.

UNITED STATES PATENT OFFICE.

HEINRICH JACOB, OF STEGLITZ, NEAR BERLIN, GERMANY, ASSIGNOR TO THE FIRM, OF OPTISCHE ANSTALT C. P. GOERZ AKTIENGESELLSCHAFT, OF FRIEDENAU, NEAR, BERLIN, GERMANY.

AIMING DEVICE.

1,160,615.     Specification of Letters Patent.     Patented Nov. 16, 1915.

Application filed February 26, 1914. Serial No. 821,124.

*To all whom it may concern:*

Be it known that I, HEINRICH JACOB, a citizen of the German Empire, and resident of Steglitz, near Berlin, Germany, have invented certain new and useful Improvements in Aiming Devices, of which the following is a specification.

The present invention refers to a device for rendering in a simple manner a beam of light, issuing from a projector lamp, parallel to a certain direction of aim, in which the direction of the aim can be given by any instrument which establishes a certain direction, especially by a telescope or the barrel of a rifle.

The aim of the invention is attained by the fact that the instrument establishes the particular direction, by preference a telescope or rifle, is connected with, and has its axis parallel to, a telescope bearing a source of light, the latter being so arranged that it is imaged in the entrance-pupil of the telescope, i. e. normally on the objective. The equipment of the telescope with such a source of light takes place to advantage by the use of a lamp fitting which can be placed on the eye-shell of the instrument, and thus forms an ocular lid. The arrangement of the source of light of the lamp is to be such that in the case of a telescope with exit-pupil lying outside the ocular the source of light coincides with the exit-pupil of the instrument, while in the case of Galilean telescopes with exit-pupil lying inside the telescope-casing the arrangement is to be such that an image of the source of light is produced in the plane of the exit-pupil. The latter takes place in the simplest case in such a manner that the lamp fitting is provided with a condensing lens of short focal distance. Instead of this a lens system can be used, which converts the Galilean telescope into an astronomical telescope or into a telescope with real image plane. The latter arrangement has the advantage over the former that in the real image plane between the lenses of the supplementary system a diaphragm can be placed which sharply limits the field of light.

If the direction in which the beam of light is to leave the telescope bearing the projector lamp is itself determined by a telescope, all that is required for the attainment of the object is the equipment of any double telescope with an ocular lid bearing the lamp and if necessary one or more lenses, in which case the necessary parallelism of the axes of the telescopes is at once given.

The new arrangement is illustrated in the accompanying drawings in several adaptations of one fundamental form.

Figure 2:
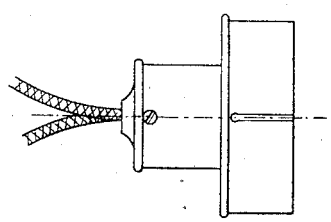
Figure 4:
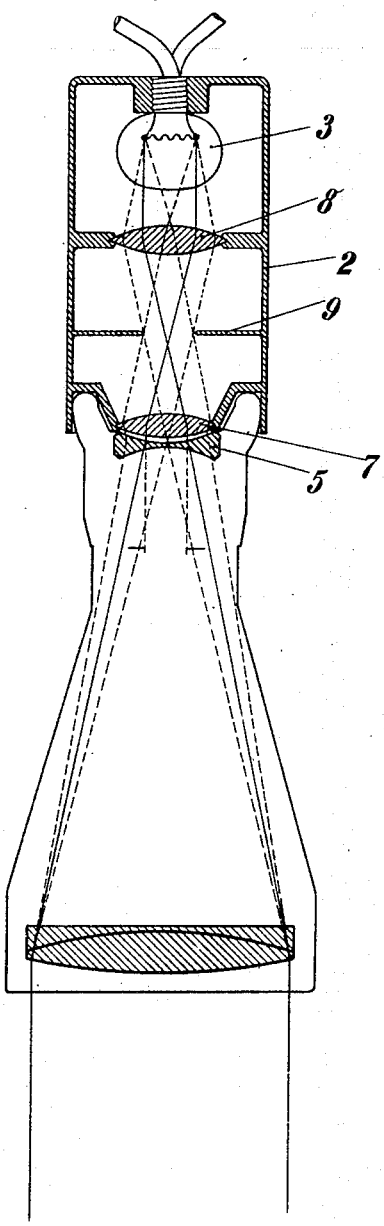

Figure 1 shows a prismatic double telescope equipped with a projector lamp; Fig. 2 shows a side view of the projector lamp fitting; Fig. 3 shows one half of a Galilean double telescope with projector lamp fitting; Fig. 4 shows a modification of the device in accordance with Fig. 3; Fig. 5 illustrates a firearm with telescopic aim and an ocular lid with projector lamp situated on the eye-shell.

In the case of the prismatic double telescope shown in Fig. 1, there is placed on the eye-shell 1 of one half of the telescope a cap 2, which bears an electric glow lamp 3. The filament of this electric glow lamp is situated at the cap 2, which is placed on the eye-shell, in the plane of the exit-pupil of the telescope, so that the rays of light issuing from the filament of the lamp are released without more ado through the optic of the instrument parallel to the direction of sight of the second half of the telescope, and in consequence the observer using the second half of the telescope surveys at any time exactly that part of the land within which the gleam of light issuing from the lamp 3 is situated.

The cap 2 can be placed on the eye-shell in any manner desired and can also be removed.

In the arrangement in accordance with Fig. 3 a detachable cap 2 with projector lamp 3 is again placed on the eye-shell of one half of a Galilean telescope. In this case the cap 2 contains a condensing lens 4 in addition to the projector lamp 3. The condensing lens 4 has a short focal distance and, when the cap 2 is placed on the eye-shell, is situated between the projector lamp 3 and the ocular lens 5 of the telescope. The condensing lens 4 is so chosen that it projects an image in the plane 6 of the virtual exit-pupil from the glow lamp filament 3. In order that it may be able to do this, it must not only have a short focal distance, but its distance from the filament 3 must at the same time be greater than its focal distance. On account of the arrangement of the glow lamp being such that an image of it is produced in the plane of the exit-pupil, in this form of execution also a cone of light results which is parallel to the optical axis of the telescope.

The form of execution shown in Fig. 4 varies from that in Fig. 3 by the fact that the cap 2, which is placed on the eye-shell, is provided with a system of lenses which in accordance with the drawing consists of two lenses 7, 8, which convert the Galilean telescope into an astronomical telescope; the real image plane of the latter is indicated at 9. At the same time a real exit-pupil is in this manner created, into which the filament of the lamp 3 is to be brought.

The conversion of the Galilean telescope into an astronomical telescope takes place suitably in the manner mentioned and shown in the drawing, by using a supplementary system with positive elements which are so far from each other that their foci coincide.

In the arrangement shown in Fig. 5, in which the fixed direction of aim is given by the barrel of a hand firearm, the firearm is marked 10. The telescope bearing the source of light is an ordinary telescopic aim 11 placed on the rifle. The eye-shell 12 of the latter bears a cap 13 with an electric glow lamp 14, the filament of which is situated in the plane of the exit-pupil of the telescope 11. As the direction of aim of the telescope 11 coincides with the aim direction of the rifle 10, and the arrangement of the glow lamp 14 in the exit-pupil of the telescope 11 gives a direction of the cone of light parallel to the aim direction of the telescope 11, the cone of light from the lamp 14 which issues from the telescope 11 lights up exactly the object at which the rifle 10 is aimed. The rifleman therefore only needs to aim his gun in such a manner that the cone of light issuing from the telescope 11 falls on the object at which he wishes to shoot. If desired the telescope 11 can be provided in an image plane with an aim. One is indicated in the figure at 15. This aim appears dark on a light ground. The barrel of the rifle corresponds to the half of the double telescope which is not provided with the projector lamp, in accordance with the arrangements represented in Figs. 1–4.

The arrangement offers the possibility of practising shooting by day with the instrument as telescope, by removing the projector lamp. By such firing practice during the day without using the projector lamp, the certainty of hitting on using the device as a search-light aim is guaranteed. There is therefore no necessity to practise shooting in the dark.

What I claim is:—

1. Device for making a beam of light, issuing from a source of light, parallel to a particular direction of aim, consisting of an instrument which fixes a certain direction of aim in connection with a telescope bearing a source of light, the telescope being so arranged that its optic axis is parallel to the direction of aim and its source of light so arranged that it is imaged in the entrance-pupil of the telescope.

2. Double telescope, one half of which is provided with a source of light which is so arranged that it is imaged in the entrance-pupil of the telescope.

3. Double telescope, one half of which bears on its eye-shell a cap with an electric lamp, the filament of which lies in the exit-pupil of the half of the telescope.

4. Galilean double telescope, one half of which bears on its eye-shell a cap with an electric lamp and a condensing lens arrangement lying between this and the ocular of the telescope, in such a manner that the lamp filament is imaged in the plane of the virtual exit-pupil.

5. Ocular lid in the form of a cap with a condensing lens of short focal distance and a glow lamp which is arranged on the side of the lens opposite to the cap opening beyond its focus.

In testimony whereof I have signed this specification in the presence of two subscribing witnesses.

HEINRICH JACOB.

Witnesses:
 HENRY HASPER,
 WOLDEMAR HAUPT.